United States Patent
Li et al.

(10) Patent No.: US 12,056,610 B2
(45) Date of Patent: Aug. 6, 2024

(54) SYSTEMS AND METHODS FOR PARTIALLY SUPERVISED LEARNING WITH MOMENTUM PROTOTYPES

(71) Applicant: Salesforce, Inc., San Francisco, CA (US)

(72) Inventors: Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 1014 days.

(21) Appl. No.: 17/005,763

(22) Filed: Aug. 28, 2020

(65) Prior Publication Data

US 2022/0067506 A1    Mar. 3, 2022

(51) Int. Cl.
*G06N 3/08* (2023.01)
*G06F 18/21* (2023.01)
*G06F 18/214* (2023.01)
*G06F 18/2431* (2023.01)

(52) U.S. Cl.
CPC .......... *G06N 3/08* (2013.01); *G06F 18/2148* (2023.01); *G06F 18/217* (2023.01); *G06F 18/2431* (2023.01)

(58) Field of Classification Search
CPC ..... G06N 3/08; G06F 18/2148; G06F 18/217; G06F 18/2431
See application file for complete search history.

(56) References Cited

PUBLICATIONS

Assran, M, et al, Recovering Petaflops in Contrastive Semi-Supervised Learning of Visual Representations, Retrieved from Internet:<https://www.researchgate.net/publication/342352939_Recovering_Petaflops_in_Contrastive_Semi-Supervised_Learning_of_Visual_Representations> (Year: 2020).*
Yao, J., et al, Safeguarded Dynamic Label Regression for Noisy Supervision, Retrieved from Internet:<https://ojs.aaai.org/index.php/AAAI/article/view/4943> (Year: 2019).*
He, K., et al, Momentum Contrast for Unsupervised Visual Representation Learning, Retrieved from Internet:<https://openaccess.thecvf.com/content_CVPR_2020/html/He_Momentum_Contrast_for_Unsupervised_Visual_Representation_Learning_CVPR_2020_paper.html> (Year: 2019).*

(Continued)

*Primary Examiner* — Miranda M Huang
*Assistant Examiner* — Bart I Rylander
(74) *Attorney, Agent, or Firm* — Haynes and Boone, LLP

(57) ABSTRACT

A learning mechanism with partially-labeled web images is provided while correcting the noise labels during the learning. Specifically, the mechanism employs a momentum prototype that represents common characteristics of a specific class. One training objective is to minimize the difference between the normalized embedding of a training image sample and the momentum prototype of the corresponding class. Meanwhile, during the training process, the momentum prototype is used to generate a pseudo label for the training image sample, which can then be used to identify and remove out of distribution (OOD) samples to correct the noisy labels from the original partially-labeled training images. The momentum prototype for each class is in turn constantly updated based on the embeddings of new training samples and their pseudo labels.

20 Claims, 9 Drawing Sheets

(56) References Cited

PUBLICATIONS

Liu, W., et al, Noise Resistant Graph Ranking for Improved Web Image Search, Retrieved from Internet:<https://ieeexplore.ieee.org/abstract/document/5995315> (Year: 2011).*

Zhang, X., et al, Self-Training With Progressive Augmentation for Unsupervised Cross-Domain Person Re-Identification, Retrieved from Internet:<https://ieeexplore.ieee.org/abstract/document/9009546> (Year: 2019).*

Chen et al., "A Simple Framework for Contrastive Learning of Visual Representations," arXiv preprint, arXiv:2002.05709v1 [cs.LG], Feb. 13, 2020, 17 pages.

Chen et al., "Improved Baselines with Momentum Contrastive Learning," arXiv preprint, arXiv:2003.04297v1 [cs.CV], Mar. 9, 2020, 3 pages.

Everingham et al. "The PASCAL Visual Object Classes (VOC) Challenge," International Journal of Computer Vision, 88(2), 2010, 34 pages.

Grill et al., "Bootstrap Your Own Latent a New Approach to Self-Supervised Learning," arXiv preprint, arXiv:2006.07733, Sep. 10, 2020, 35 pages.

Guo et al., "CurriculumNet: Weakly Supervised Learning from Large-Scale Web Images," arXiv preprint, arXiv:1808.01097v1 [cs.CV] Aug. 3, 2018, 16 pages.

He et al., "Deep Residual Learning for Image Recognition," arXiv preprint, arXiv:1512.03385v1 [cs.CV] Dec. 10, 2015, 12 pages.

Hendrycks et al., "The Many Faces of Robustness: A Critical Analysis of Out-of-Distribution Generalization," arXiv preprint, arXiv:2006.16241v2 [cs.CV] Aug. 13, 2020, 18 pages.

Hendrycks et al., "Natural Adversarial Examples," arXiv preprint, arXiv:1907.07174v2 [cs.LG] Jul. 18, 2019, 12 pages.

Jiang et al., "MentorNet: Learning Data-Driven Curriculum for Very Deep Neural Networks on Corrupted Labels," Proceedings of the 35 th International Conference on Machine Learning, Stockholm, Sweden, PMLR 80, 2018, 20 pages.

Lee et al., "CleanNet: Transfer Learning for Scalable Image Classifier Training with Label Noise," arXiv preprint, arXiv:1711.07131v2 [cs.CV] Mar. 25, 2018, 10 pages.

Li et al., "WebVision Database: Visual Learning and Understanding fromWeb Data," arXiv preprint, arXiv:1708.02862v1 [cs.CV] Aug. 9, 2017, 9 pages.

Lin et al., "Microsoft COCO: Common Objects in Context," arXiv preprint, arXiv:1405.0312v2 [cs.CV] Jul. 5, 2014, 14 pages.

Mahajan et al., "Exploring the Limits of Weakly Supervised Pretraining," arXiv preprint, arXiv:1805.00932v1 [cs.CV] May 2, 2018, 23 pages.

Tu et al."Learning fromWeb Data with Self-Organizing Memory Module," arXiv preprint, arXiv:1906.12028v5 [cs.CV] Mar. 11, 2020, 10 pages.

Zhou et al., "Learning Deep Features for Scene Recognition using Places Database," in NIPS, 2014, 9 pages.

* cited by examiner

Algorithm 1: MoPro's main algorithm.

1. Input: number of classes $K$, temperature $\tau$, threshold $T$, momentum $m$, encoder network $f(\cdot)$, projection network $g(\cdot)$, classifier $h(\cdot)$, momentum encoder $g'(f'(\cdot))$.
2. for $\{(x_i, y_i)\}_{i=1}^b$ in loader do  // load a minibatch of noisy training data
3.     for $i \in \{1, ..., b\}$ do
4.         $\tilde{x}_i = \text{weak\_aug}(x_i)$  // weak augmentation
5.         $\tilde{x}'_i = \text{strong\_aug}(x_i)$  // strong augmentation
6.         $v_i = f(\tilde{x}_i)$  // representation
7.         $z_i = g(v_i)$  // normalized low-dimensional embedding
8.         $z'_i = g'(f'(\tilde{x}'_i))$  // momentum embedding
9.         $p_i = h(v_i)$  // class prediction
10.       $s_i = \{s_i^k\}_{k=1}^K, s_i^k = \frac{\exp(z_i \cdot c_k / \tau)}{\sum_{k=1}^K \exp(z_i \cdot c_k / \tau)}$  // prototypical score
        // noise correction
11.       $q_i = (p_i + s_i)/2$  // soft pseudo-label
12.       if $\max_k q_i^k > T$ then
13.         $\tilde{y}_i = \arg\max_k q_i^k$
14.       else if $q_i^{y_i} > 1/K$ then
15.         $\tilde{y}_i = y_i$
16.       else
17.         $\tilde{y}_i = \text{OOD}$
18.       end
        // calculate losses
19.       $\mathcal{L}_{\text{ins}}^i = -\log \frac{\exp(z_i \cdot z'_i / \tau)}{\sum_{j=0}^r \exp(z_i \cdot z'_j / \tau)}$  // instance contrastive loss
20.       if $\tilde{y}_i$ is not OOD then
21.         $\mathcal{L}_{\text{pro}}^i = -\log \frac{\exp(z_i \cdot c_{\tilde{y}_i} / \tau)}{\sum_{k=1}^K \exp(z_i \cdot c_k / \tau)}$  // prototypical contrastive loss
22.         $\mathcal{L}_{\text{ce}}^i = -\log(p_i^{\tilde{y}_i})$  // cross entropy loss
23.       else
24.         $\mathcal{L}_{\text{pro}}^i = \mathcal{L}_{\text{ce}}^i = 0$
25.       end
        // update momentum prototypes
26.       $c_k \leftarrow m c_k + (1-m) z_i$
27.     end
28.     $\mathcal{L} = \sum_{i=1}^b (\mathcal{L}_{\text{ce}}^i + \mathcal{L}_{\text{pro}}^i + \mathcal{L}_{\text{ins}}^i)$  // total loss
29.     update networks $f, g, h$ to minimize $\mathcal{L}$.
30. end

*FIG. 4*

SYSTEMS AND METHODS FOR PARTIALLY SUPERVISED LEARNING WITH MOMENTUM PROTOTYPES

TECHNICAL FIELD

The present disclosure relates generally to training and use of machine learning systems and more specifically to partially supervised learning techniques based on momentum prototypes.

BACKGROUND

Neural networks have demonstrated great promise as a technique for automatically analyzing real-world information with human-like accuracy. For example, a neural network model may be used to identify objects or content of an image, such as an "orange," a "dog" and/or the like in a specific image. The neural network model may be trained using a large number of training images, proceeding iteratively until the neural network model begins to consistently make similar inferences from the training images that a human may make. Traditionally, the neural network models are mostly trained on clean datasets with high-quality human annotations. However, manual data cleaning and labeling can be expensive, labor intensive and also difficult to scale, i.e., whenever a new dataset of training images is available, the new thousands of images need to be reviewed and processed by manual annotation.

Therefore, there is a need for an efficient learning mechanism in computer vision.

BRIEF DESCRIPTION OF THE DRAWINGS

FIG. 4 provides an example diagram illustrating pseudo-code of the partially supervised learning with momentum prototypes as implemented by the momentum prototype framework 130 in FIG. 1 or 200 in FIG. 2, according to one embodiment described herein.

Figure 1:
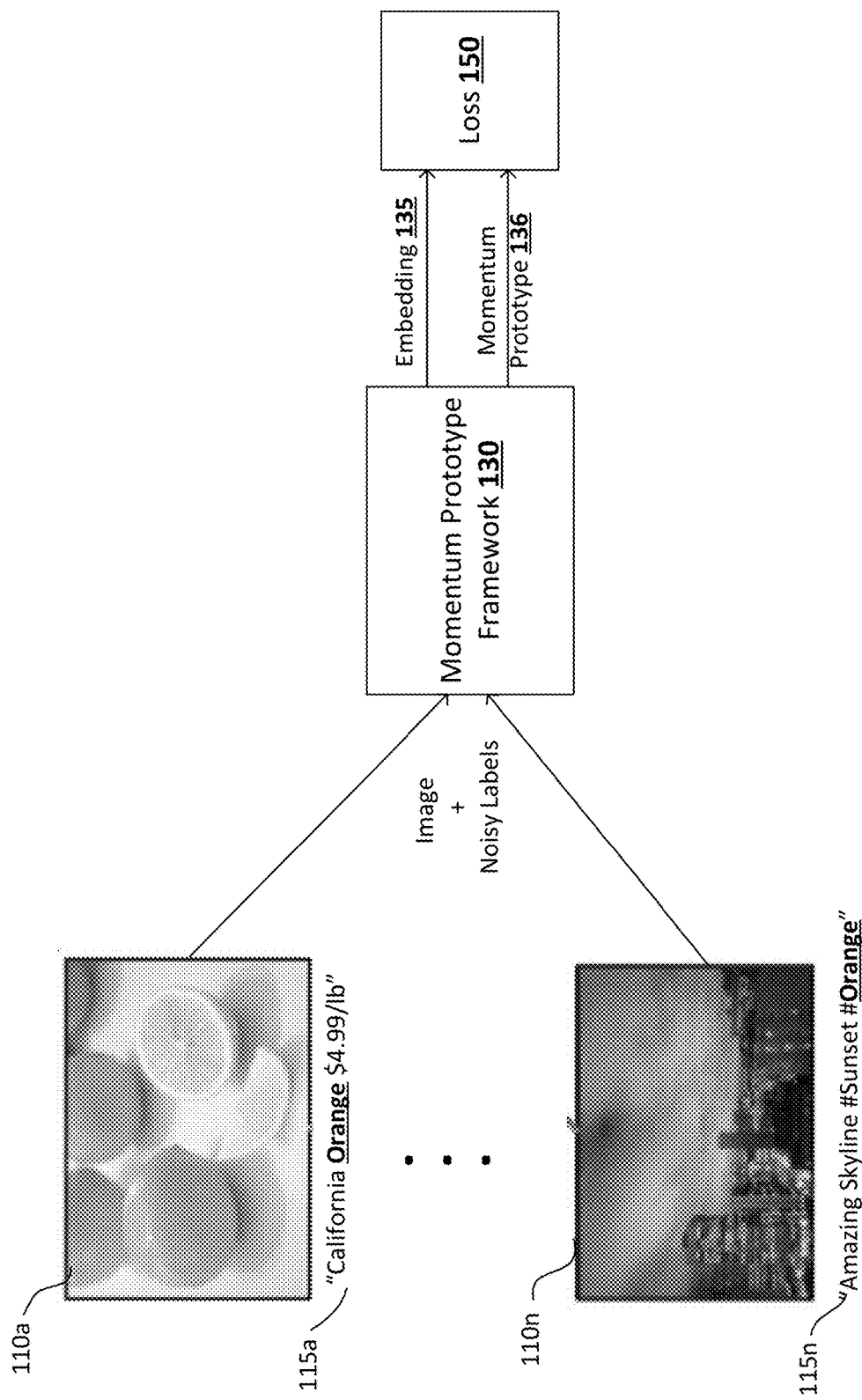
FIG. 1 provides an example diagram illustrating an aspect of using partially-labeled image data for training a momentum prototype framework in computer vision, according to an embodiment described herein.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

Large-scale datasets with human-annotated labels can be used to train neural models to identify content or objects in an image to realize computer vision. However, manually annotating millions of images (referred to as "supervised learning") can expensive and labor-intensive, which makes it a non-scalable solution. Some existing systems adopt self-supervised learning methods, which does not require the labor-intensive annotation for the training datasets, also does not achieve comparable performance with supervised learning, especially when transferred to downstream tasks with limited labels.

On the other hand, a large number of images with captions can be obtained from commercial search engines, photo-sharing websites, and social media platforms, while the available captions may serve as noisy labels for the images. Some existing systems adopt such images with noisy labels for supervised learning without accounting for the prevalent noise in the training data, only resulting in compromised prediction accuracy of the trained neural network model.

In view of the need for efficient representation learning that utilize the available images that are at least partially labeled, embodiments described herein provide a learning mechanism with partially-labeled web images while correcting the noise labels during the learning. Specifically, the mechanism employs a momentum prototype that represents common characteristics of a specific class. One training objective is to minimize the difference between the normalized embedding of a training image sample and the momentum prototype of the corresponding class. Meanwhile, during the training process, the momentum prototype is used to generate a pseudo label for the training image sample, which can then be used to identify and remove out of distribution (OOD) samples to correct the noisy labels from the original partially-labeled training images. The momentum prototype for each class is in turn constantly updated based on the embeddings of new training samples and their pseudo labels. In this way, by minimizing an entropy loss between the embedding and the momentum prototype of a corresponding class, the neural network models are trained to increase the similarity between its embeddings and the class prototypes.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "partially" is used to refer to something that is to a limited extent. For example, a partially-labeled image may be annotated with only a certain type of labels (e.g., a noisy class label directly generated from captions accompanying the image that is available at commercial search engines, photo-sharing websites, and social media platforms, etc.), while absent another type of labels (e.g., an accurate manually annotated label). Namely, partially supervised training is used to refer to a training mechanism using only training data with one or more limited types of annotated labels. For example, with embodiments described herein, partially supervised learning is used to refer to a learning mechanism that is trained using datasets of training data samples such as images with noisy labels, but without high-quality manually annotated class labels.

Overview

FIG. 1 provides an example diagram illustrating an aspect of using partially-labeled image data for training a momentum prototype framework in computer vision, according to an embodiment described herein. Commercial search engines, photo-sharing websites, and social media platforms, and/or other online sources may provide a large amount of images 110a-n with caption data, while caption data may provide a noisy label for the respective image. For example, the image 110a may be an image obtained from an online shopping website, with accompanying caption 115a "California orange $4.99/1b." In this case, image 110a may be associated with a noisy label "orange," which is fairly accurate for image 110a. For another example, the image 110n may be an image obtained from social media postings, with the text 115n "Amazing Skyline #orange." If the word "orange" is extracted from the text 115n as a noisy label for image 110n, the label can be rather inaccurate. Thus, the image data 110a-n with their noisy labels can be input to a momentum prototype framework 130, which is configured to train neural network models based on the image data 110a-n under noisy labels.

Specifically, the momentum prototype framework 130 is configured to compare the encoder embeddings 135 generated from the input image data 110a-n and a computed component, referred to as momentum prototype that corresponds to a specific class 136. The momentum prototype 136 may represent common characteristics of data samples (e.g., images) of a specific class. Thus, the difference between the embeddings 135 and the momentum type 136 may be computed as a training loss 150. Details of the momentum prototype framework 130 utilizing image data with noisy labels for training are further provided in FIGS. 2 and 4-8.

Figure 2:
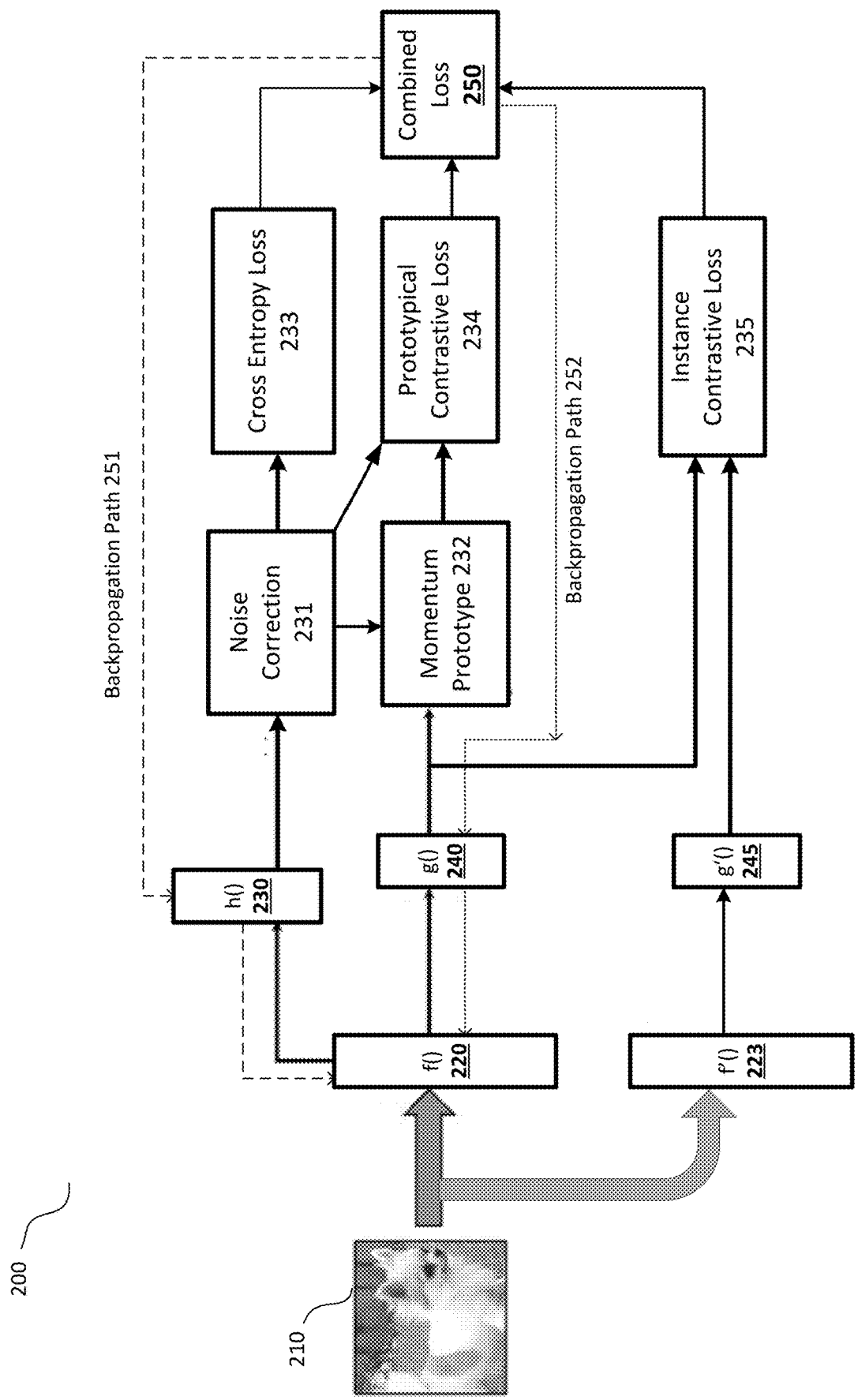
FIG. 2 provides an example diagram illustrating a partially-supervised learning framework based on image data with noisy labels illustrated in FIG. 1, according to one embodiment described herein.

FIG. 2 provides an example diagram 200 illustrating a partially-supervised learning framework based on image data 110a-n with noisy labels illustrated in FIG. 1, according to one embodiment described herein. The input training data sample 210, which may be a data sample from a noisy training dataset $\{(x_i, y_i)\}_{i=1}^n$, where $x_i$ denotes an image and $y_i \in \{1, \ldots K\}$ is its class label. The training data sample 210 may be (optionally) augmented to form an augmented image $\tilde{x}_i$. For example, the image data sample 210 may be cropped, flipped horizontally or vertically, enlarged, and/or otherwise generated into a different form to form the augmented image $\tilde{x}_i$.

The augmented image $\tilde{x}_i$ may be input to an encoder network 220, denoted by f( ), which maps the augmented image $\tilde{x}_i$ to a representation vector $v_i \in \mathbb{R}^{d_e}$ For example, the encoder network 220 may be the ResNet-50 described in He et al., 2Deep residual learning for image recognition, in Proceedings of CVPR, pp. 770-778, 2016, which is hereby expressly incorporated by reference herein in its entirety. The activations of the final global pooling layer ($d_e$=2048) of the ResNet-50 are used as the representation vector.

The output from the encoder network 220 is then sent to a classifier 230 (a fully-connected layer followed by softmax), denoted by h( ), which receives the representation $v_i$ as input and outputs a class predictions $p_i$. The class predictions $p_i$ may then be sent to the noise correction module 231, which in turn generates a pseudo-label $\hat{y}_i$ for each image $x_i$, which can be regarded as a corrected label. Details for generating the pseudo-label is provided in FIG. 7. The pseudo-label $\hat{y}_i$ are then sent to a cross entropy loss module 233. For example, a cross-entropy loss is computed using pseudo-labels as targets to train the classifier 230 h( ).

In parallel to the cross entropy loss, the representation $v_i$ from the encoder network 220 is also sent to a projection network 240, denoted by g( ), which maps the representation $v_i$ into a low-dimensional embedding $z_i \in \mathbb{R}^{d_p}$. For example, the projection network 240 may be a multilayer perceptron (MLP) with one hidden layer as described in SimCLR (see Chen et al, a Simple Framework for Contrastive Learning of Visual Representations, in Proceedings of ICML, 2020a, which is hereby expressly incorporated by reference herein in its entirety) with $d_p$=128. In one implementation, $z_i$ may be normalized to the unit sphere.

The normalized embeddings $z_i$ are then sent to the momentum prototype update module 232, which computes or updates the current momentum prototype $c \in \mathbb{R}^{d_p \times K}$ based on the normalized embeddings $z_i$ and the pseudo labels obtained from the noise correction module 231. Specifically, the momentum prototype of the k-th class, $c_k$, is the moving-average embedding for samples with pseudo-label $\hat{y}_i$=k. Further details of computing or updating the momentum prototypes are discussed in relation to FIGS. 6A-6B.

The prototypical contrastive loss module 234 receives the momentum prototype $c_k$, the pseudo label $\hat{y}_i$ from the noise correction module 231, and in turn computes the prototypical contrastive loss $\mathcal{L}_{pro}$ which increases the similarity between an embedding and its corresponding class prototype, $(z_i, c_{\hat{y}i})$, in contrast to other proto-types. Further details regarding to computing the prototypical contrastive loss $\mathcal{L}_{pro}$ is provided in relation to FIG. 8.

In parallel to the prototypical contrastive loss, the input augmented image $\tilde{x}_i$ is also input to a momentum encoder 223, denoted by f'( ), followed by a momentum decoder 245, denoted by g'( ). The combination of the momentum encoder 223 and the momentum decoder 245 generates momentum embeddings $z_i'$ from the augmented image $\tilde{x}_i$. In one implementation, a relatively stronger augmented image $\tilde{x}_i$ (e.g., with color change) may be input to the momentum encoder 223, while a relatively less augmented image $\tilde{x}_i$ (e.g., cropping, flipping, etc.) is input to the encoder 220. The momentum encoder 223 and the momentum decoder 245 may have similar architectures as those of the encoder 220 and projection network 240, respectively, with its parameters are the moving-average of the parameters of the encoder 220 and the projection network 240, respectively. A queue of momentum embeddings of past samples may be maintained.

The instance contrastive loss module 235 may receive momentum embeddings $z_i'$ from the momentum decoder 245, and the normalized embeddings $z_i$ from the projection network 240. The instance contrastive loss module 235 may then compute the instance contrastive loss $\mathcal{L}_{ins}$ by comparing the momentum embeddings and the normalized embeddings. Details of computing the instance contrastive loss $\mathcal{L}_{ins}$ may be provided in relation to FIG. 8.

Thus, the combined loss module 250 may compute a weighted sum of the three loss: (1) a prototypical contrastive loss $\mathcal{L}_{pro}$ from module 234 which increases the similarity between an embedding and its corresponding class prototype, $(z_i, c_{\hat{y}i})$, in contrast to other proto-types; (2) an instance contrastive loss $\mathcal{L}_{ins}$ from module 235 which increases the similarity between two embeddings of the same source image, $(z_i, z_i')$, in contrast to embeddings of other images; and (3) a classification loss from module 233.

The combined loss module 250 may jointly optimize the contrastive losses and the classification loss. For example, the classifier 230 may be updated via the backpropagation path 251, while the projection network 240 and the encoder 220 may be updated via the backpropagation path 252. The momentum encoder 223 and the momentum decoder 245 may in turn be updated based on the parameters of the projection network 240 and the encoder 220.

Computer Environment

Figure 3:
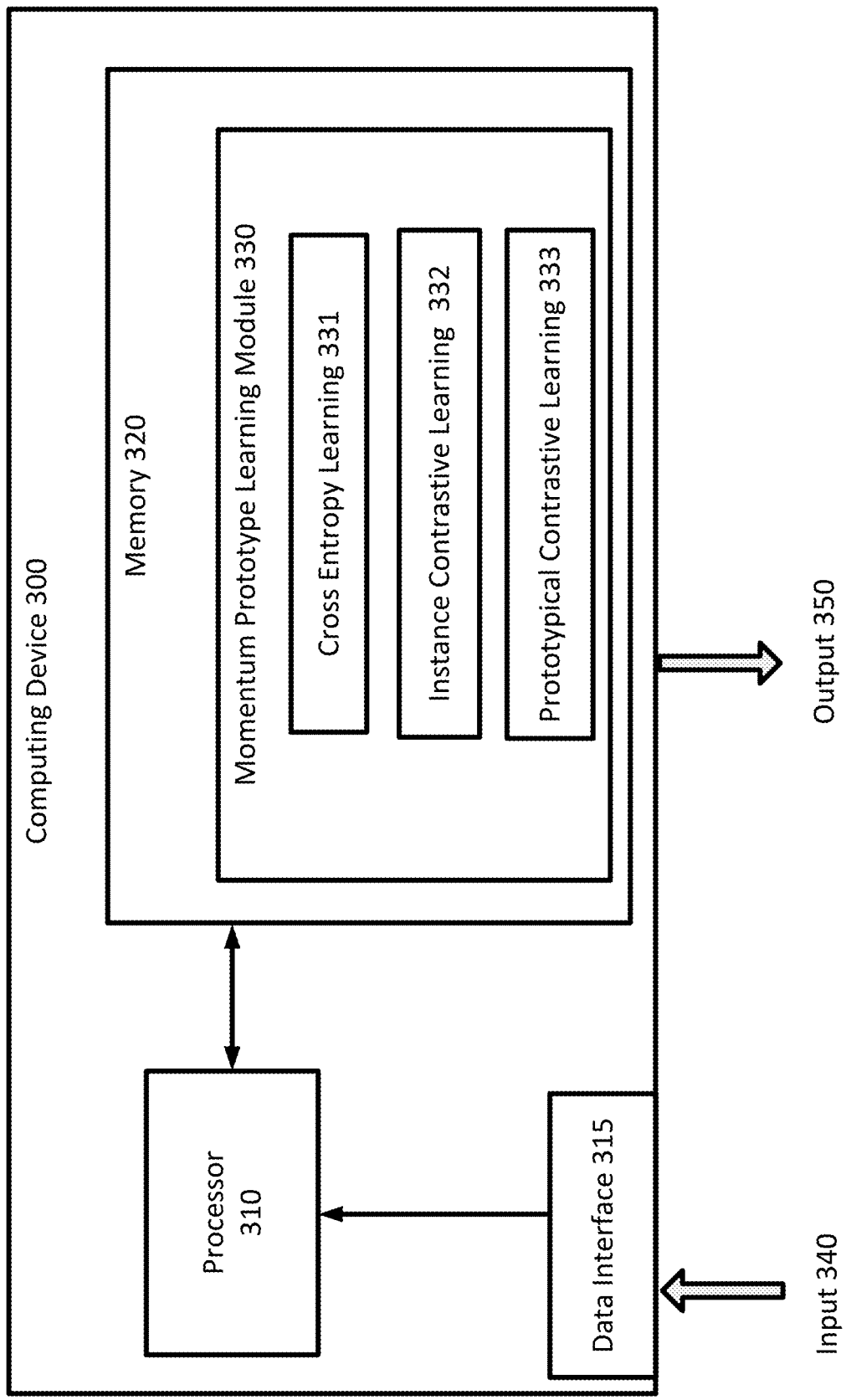
FIG. 3 is a simplified diagram of a computing device for implementing the momentum prototype learning framework described in FIGS. 1-2, according to some embodiments.

FIG. 3 is a simplified diagram of a computing device for implementing the momentum prototype learning framework described in FIGS. 1-2, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for a momentum prototype learning module 330 that may be used to implement and/or emulate the systems and models, and/or to implement any of the methods described further herein. In some examples, the momentum prototype learning module 330 may be used to receive and handle the input 340 via a data interface 315. For example, the input 340 may include an image uploaded by a user via a user interface, a dataset of training images received via a communication interface, etc. The self-supervised learning module 330 may generate an output 350, e.g., such as a class label corresponding to the input image. In some examples, the momentum prototype learning module 330 may also handle the iterative training and/or evaluation of a system or model.

In some embodiments, the momentum prototype learning module 330 includes a cross entropy learning module 331, an instance contrastive learning module 332 and a prototypical contrastive learning module 333. For example, the cross-entropy learning module 331 may be configured to compute a cross entropy loss based on a classifier output. The cross entropy learning module 331 may include any combination of, and may perform any functions of the classifier 230, the noise correction module 231, and the cross-entropy loss module 233 in FIG. 2.

For another example, the prototypical contrastive learning module 333 may be configured to compute a prototypical contrastive loss based on a momentum prototype and a normalized embedding of the input 340. The prototypical contrastive learning module 333 may include any combination of, and may perform any functions of the encoder 220, the projection network 240, the momentum prototype module 232 and the prototypical contrastive loss module 234.

For another example, the instance contrastive loss learning module 332 may be configured to compute an instance contrastive loss based on a normalized embedding of the input 340 and a momentum embedding of the input 340. The instance contrastive loss learning module 332 may include any combination of and may perform any functions of the momentum encoder 223, the momentum decoder 245 and the instance contrastive loss 235.

The modules and/or submodules 331-333 may be operated in parallel, concurrently, alternately, or in other manners. In some examples, the momentum prototype learning module 330 and the sub-modules 331-333 may be implemented using hardware, software, and/or a combination of hardware and software.

Partially Supervised Learning with Momentum Prototypes

FIG. 4 provides an example diagram illustrating pseudo-code of the partially supervised learning with momentum prototypes as implemented by the momentum prototype framework 130 in FIG. 1 or 200 in FIG. 2, according to one embodiment described herein. The pseudo-code in FIG. 4 can be further described by the flow charts in FIGS. 5A-5B and 6-7.

Figure 5A:
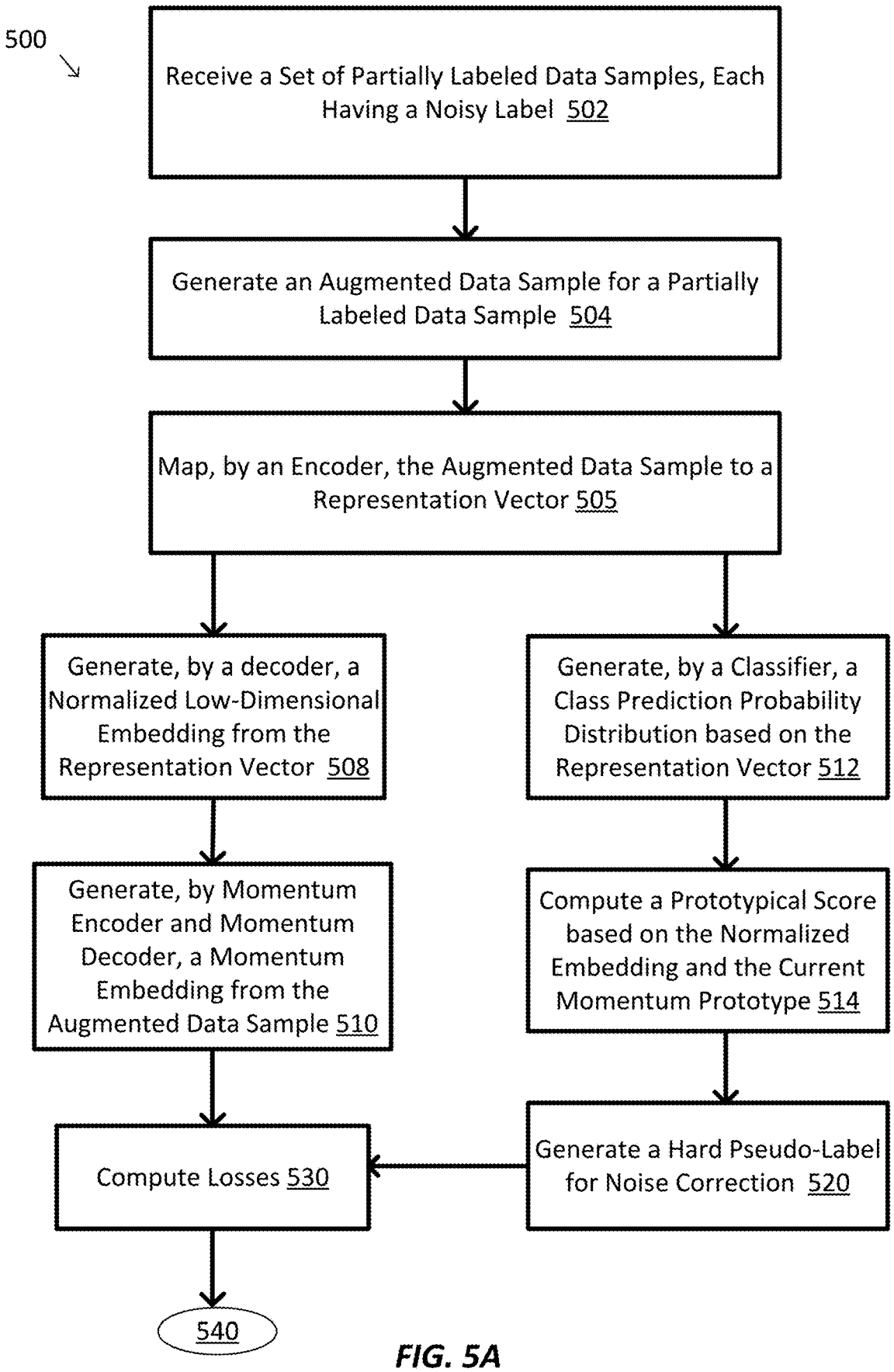
FIG. 5A-5B provides an example flow diagram illustrating a method of partially supervised learning with momentum prototypes that may be similar to the process described by the pseudo-code in FIG. 4, according to one embodiment described herein.
Figure 5B:
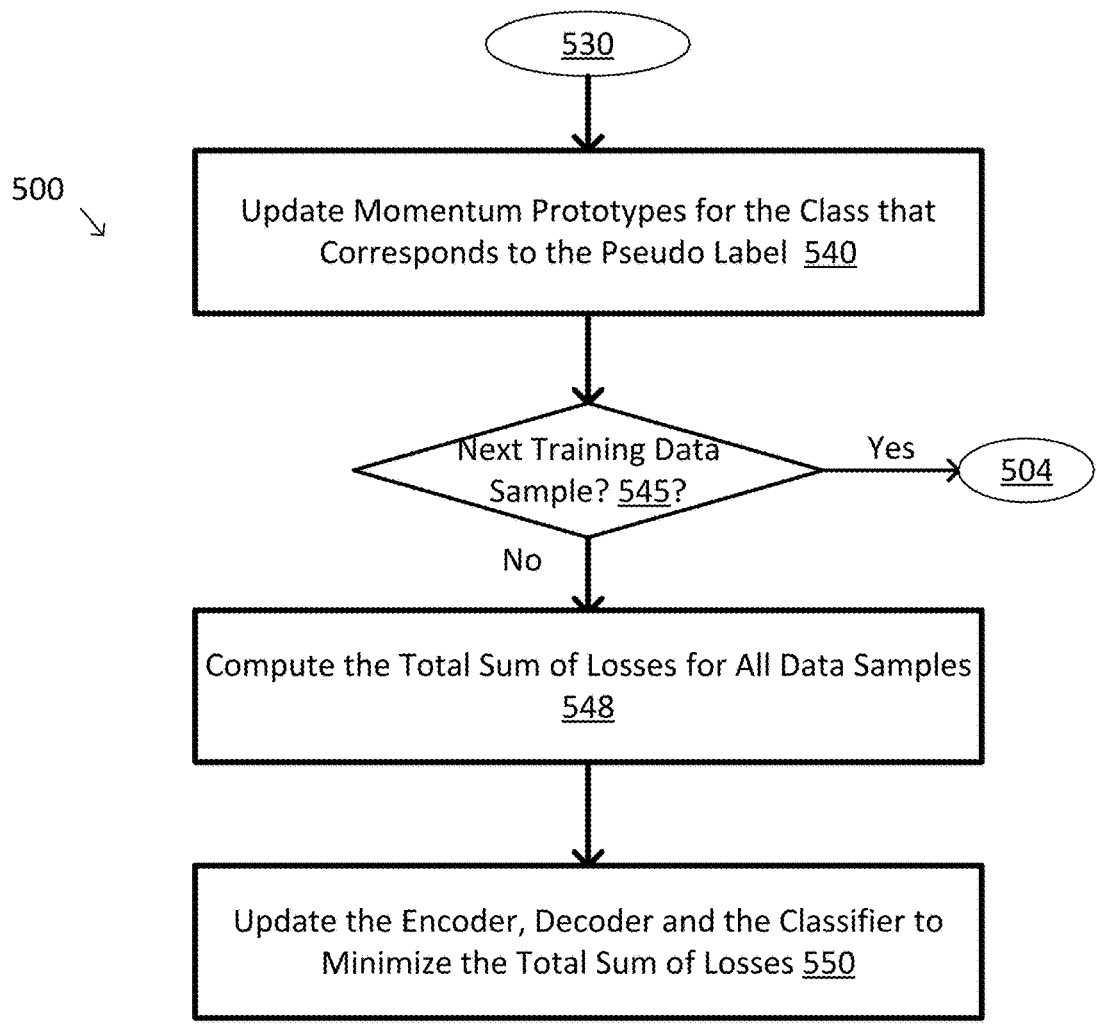

FIG. 5A-5B provides an example flow diagram illustrating a method of partially supervised learning with momentum prototypes that may be similar to the process described by the pseudo-code in FIG. 4, according to one embodiment described herein. One or more of the processes 502-550 of method 500 may be implemented, at least in part, in the form of executable code stored on non-transitory, tangible, machine-readable media that when run by one or more processors may cause the one or more processors to perform one or more of the processes 502-550. In some embodiments, method 500 may correspond to the method used by the momentum prototype learning module 330.

Method 500 starts at process 502, where a set of partially labeled data samples $\{(x_i, y_i)\}_{i=1}^n$ may be received, with $x_i$ denoting an image and $y_i \in \{1, \ldots K\}$ is its noisy label.

At process 504, an augmented data sample $\tilde{x}_i$ for a partially labeled data sample $x_i$ may be generated. For example, the image data sample $x_i$ may be cropped, flipped horizontally or vertically, enlarged, and/or otherwise generated into a different form to form the augmented image $\tilde{x}_i$. In some implementations, two versions of augmented image $\tilde{x}_i$, a strong augmentation, and a weak augmentation may be generated.

At process 505, the augmented data sample $\tilde{x}_i$ may be mapped to a representation vector $v_i$, e.g., by the encoder 220, $v_i = f(\tilde{x}_i)$.

Process 505 may proceed to processes 508 and 512 concurrently, in parallel, alternately, or in any other manner. At process 508, a normalized low-dimensional embedding $z_i$ is generated from the representation vector $v_i$, e.g., $z_i = g(v_i)$ =g (f($\tilde{x}_i$)). At process 510, a momentum embedding is generated by the momentum encoder 223 and the momentum decoder 245 from the augmented data sample, e.g., $z_i'$=g'(f'($\tilde{x}_i$)). In one implementation, the augmented data sample used in processes 508 and 510 may be the same. In another implementation, process 508 may be applied to a relatively weak augmentation, while process 510 may be applied to a relatively strong augmentation. At process 530, losses may be computed, which is further described in FIG. 7.

At process 512, a classification prediction probability distribution may be generated by classifier 230, e.g., $p_i$=h($v_i$). At process 514, a prototypical score may be computed based on the normalized embedding and the current momentum prototype for each class k, e.g., $$S_i^k = \frac{\exp(z_i \cdot \frac{c_k}{\tau})}{\sum_{k=1}^{K} \exp(z_i \cdot \frac{c_k}{\tau})}, \text{ for } k = 1, \ldots, K.$$

Figure 6:
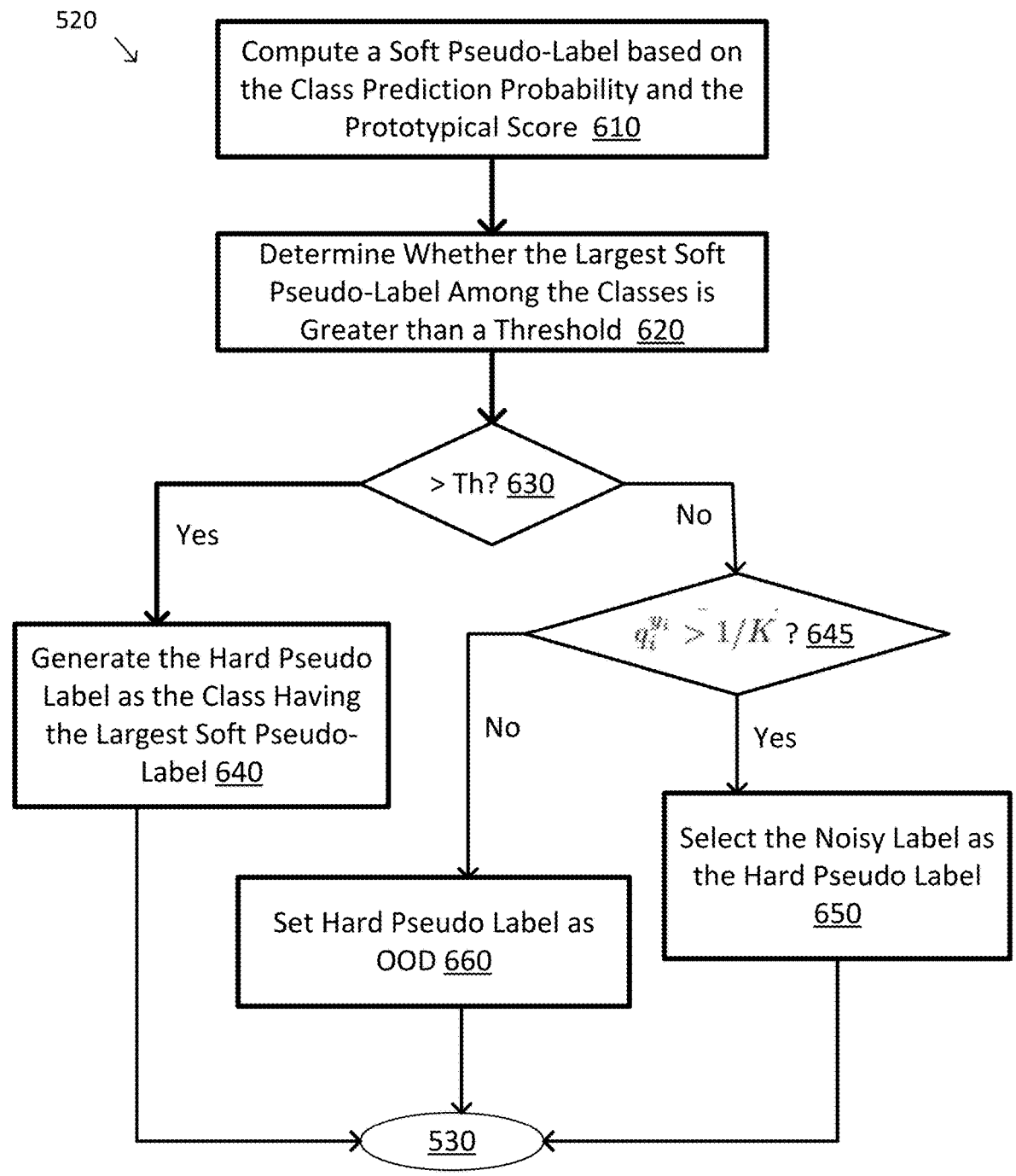
FIG. 6 provides an example flow diagram illustrating the process of generating a pseudo label for noise correction in FIG. 5A, according to one embodiment described herein.

At process 520, a hard pseudo label for noise correction may be generated, which is further described in FIG. 6. Specifically, online noise correction is applied during training, which cleans label noise and removes OOD samples.

Method 500 proceeds from processes 530 and 520 to process 540, where the momentum prototype for the class that corresponds to the pseudo label may be updated. For example, for each class k, the momentum prototype is calculated as a moving-average of the normalized embeddings for samples with pseudo-label k. Specifically, c k is updated by:

$$c_k \leftarrow mc_k + (1-m)z_i, \forall i \in \{i|\hat{y}_i = k\}.$$

Here m is a momentum coefficient and may be set as m=0:999 in one implementation.

At process 545, after updating the momentum prototype, it is determined whether there are more training data samples in the set of training samples. If there are more training samples, method 500 repeats at process 504. If no more training samples is left in the set of training samples, method 500 proceeds to process 548, where a loss is computed as the total sum of losses for all data samples. At process 550, the encoder, decoder and the classifier may then be updated to minimize the total sum of losses, e.g., as shown by backpropagation paths 251-252 in FIG. 2.

FIG. 6 provides an example flow diagram illustrating the process 520 of generating a pseudo label for noise correction in FIG. 5A, according to one embodiment described herein. One or more of the processes 610-660 of process 520 may be implemented, at least in part, in the form of executable code stored on non-transitory, tangible, machine-readable media that when run by one or more processors may cause the one or more processors to perform one or more of the processes 610-660. In some embodiments, method 520 may correspond to the method used by the momentum prototype learning module 330.

At process 610, a soft pseudo-label $q_i$ is computed by combining the classifier's output probability $p_i$ with prototypical scores $s_i$, $$q_i = \alpha p_i + (1-\alpha) s_i.$$

where the combination weight may be set as α=0.5 as one example.

At process 620, it is determined whether the largest soft pseudo-label among the classes is greater than a threshold. For example, if the highest score of $q_i$ is above certain threshold T, method 520 proceeds from process 630 to process 640, where the highest score is generated as the hard pseudo label. Otherwise, if the score for the original label $y_i$ is higher than uniform probability, method 520 proceeds from process 630 to 645 and then 650, where the noisy label $y_i$ is selected as the hard pseudo label. Otherwise, if the score for the original label $y_i$ is not higher than uniform probability, the data sample is considered as an OOD sample. For example, the hard pseudo label can be generated by:

$$\hat{y}_i = \begin{cases} \arg\max_k q_i^k & \text{if } \max_k q_i^k > T, \\ y_i & \text{elseif } q_i^k > \frac{1}{K}, \\ OOD & \text{otherwise.} \end{cases}$$

Thus, following process 660, OOD samples may be removed from both the cross-entropy loss and the prototypical contrastive loss so that they do not affect class-specific learning, but include them in the instance contrastive loss to further separate them from in-distribution samples.

Figure 7:
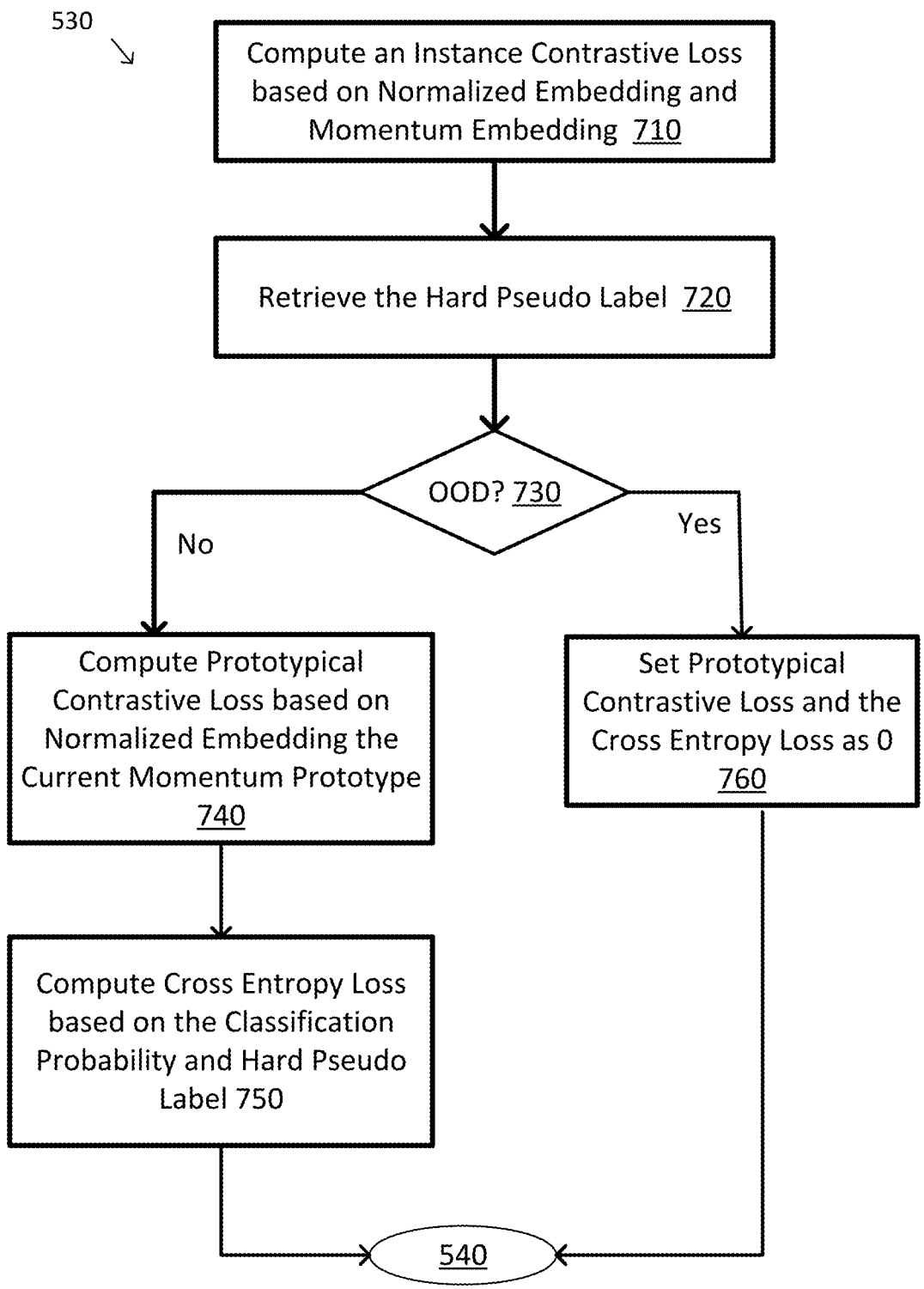
FIG. 7 provides an example flow diagram illustrating the process of computing losses in FIG. 5A, according to one embodiment described herein.

FIG. 7 provides an example flow diagram illustrating the process 530 of computing losses in FIG. 5A, according to one embodiment described herein. One or more of the processes 710-760 of process 520 may be implemented, at least in part, in the form of executable code stored on non-transitory, tangible, machine-readable media that when run by one or more processors may cause the one or more processors to perform one or more of the processes 710-760. In some embodiments, method 530 may correspond to the method used by the momentum prototype learning module 330.

At process 710, an instance contrastive loss $\mathcal{L}_{ins}$ is computed based on the normalized embedding and the momentum embedding, which increases the similarity between the two embeddings of the same source image, ($z_i$, $z_i'$), in contrast to embeddings of other images. For example, $\mathcal{L}_{ins}^i$ may be given by:

$$\mathcal{L}_{ins}^i = -\log \frac{\exp(z_i \cdot \frac{z_i'}{\tau})}{\sum_{r=0}^{R} \exp(z_i \cdot \frac{z_r'}{\tau})}.$$

where τ is a temperature parameter, and y ti is the pseudo-label. A total number of R negative momentum embeddings are used to construct the denominator of the instance contrastive loss.

At process 720, the hard pseudo label may be retrieved, and determined whether it is OOD. At process 730, if the pseudo label is OOD, method 530 proceeds from process 730 to process 760, where the prototypical contrastive loss and the cross-entropy loss are set as 0.

Otherwise, if the pseudo label is not OOD, method 530 proceeds from process 730 to process 740. At process 740, the prototypical contrastive loss $\mathcal{L}_{pro}$ is computed based on normalized embeddings and the current momentum prototype, which increases the similarity between an embedding and its corresponding class prototype, ($z_i$, $c_{\hat{y}_i}$), in contrast to other proto-types. Specifically, the prototypical contrastive loss is defined as:

$$\mathcal{L}_{pro}^{i} = -\log \frac{\exp\left(z_i \cdot \frac{c_{\hat{y}_i}}{\tau}\right)}{\sum_{k=1}^{K} \exp\left(z_i \cdot \frac{c_k}{\tau}\right)}.$$

At process 750, the cross-entropy loss is computed based on the classification probability and using pseudo-labels as targets:

$$\mathcal{L}_{ce}^{i} = -\log(p_i^{\hat{y}_i})$$

Referring to FIG. 5B, at process 548, the contrastive losses and the classification loss may be combined for joint training. The training objective is:

$$\mathcal{L} = \sum_{i=1}^{n} \mathcal{L}_{ce}^{i} + \lambda_{pro}\mathcal{L}_{pro}^{i} + \lambda_{ins}\mathcal{L}_{ins}^{i},$$

where n denotes the total number of data samples in the training batch, and the coefficients $\lambda_{pro}$ and $\lambda_{ins}$ may be set to 1 for one example.

Figure 8:
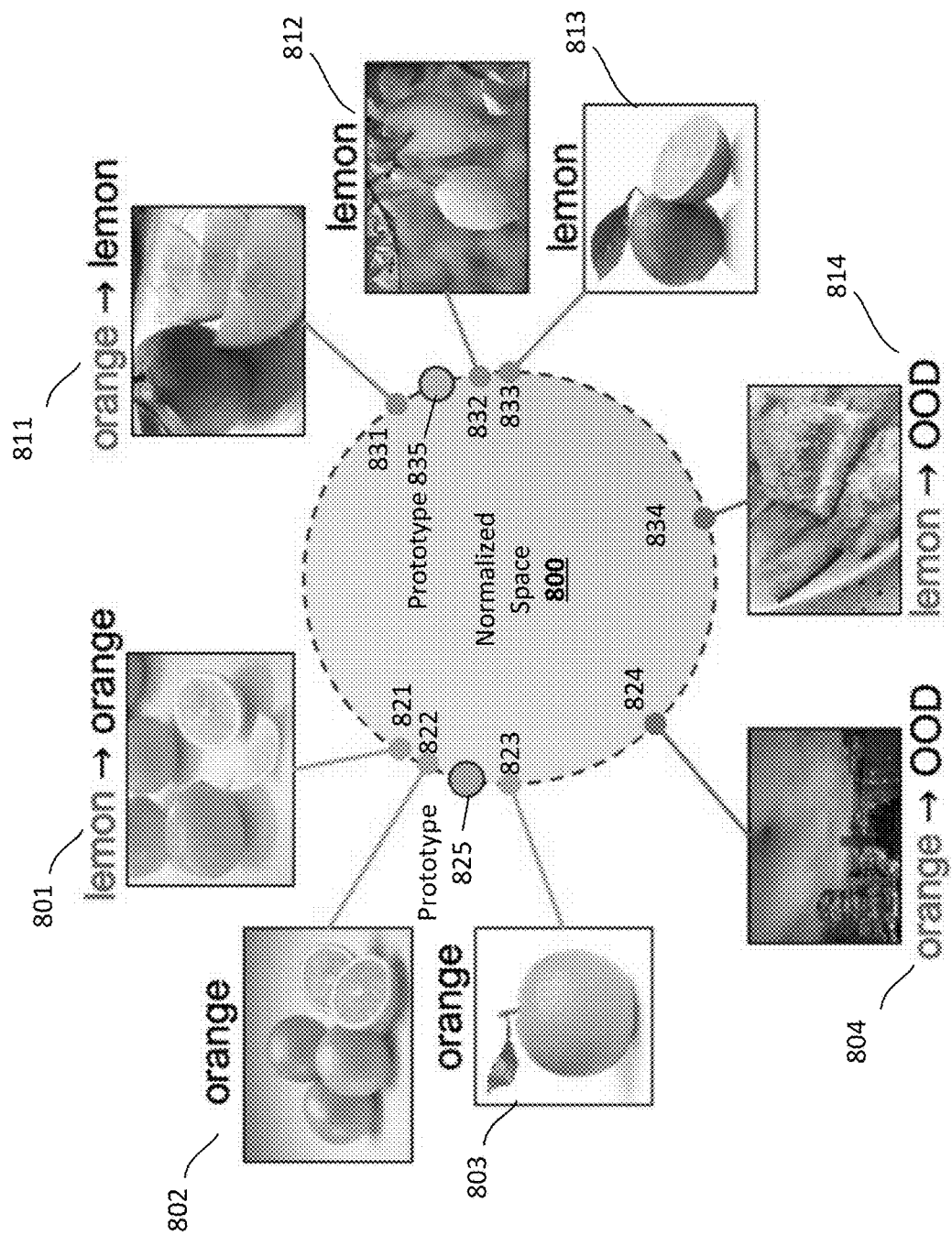
FIG. 8 provides an example diagram illustrating the normalized embedding space learned with the partially-labeled learning mechanism described in FIGS. 4-7, according to one embodiment described herein.

FIG. 8 provides an example diagram illustrating the normalized embedding space 800 learned with the partially-labeled learning mechanism described in FIGS. 4-7, according to one embodiment described herein. The normalized embedding space 800 is illustrated by a unit circle, where the normalized embeddings 821-824 corresponding to image samples 801-804, and normalized embeddings 831-834 corresponding to image samples 811-814 are distributed on the unit circle.

Specifically, image samples 802-804 and 811 are images with noisy label "orange," with a momentum prototype 825 corresponding to the class label "orange." Image samples 812-814 and 801 are images with noisy label "lemon," and with a momentum prototype 835 corresponding to the class label "lemon." Thus, upon prototypical contrastive learning, samples from the same class gather around their class prototype, whereas OOD samples are separated from in-distribution samples. Label correction and OOD removal are achieved based on a sample's distance with the prototypes. For example, image sample 801 has its noisy label "lemon" corrected as "orange" as embedding 821 for image sample 801 is closely located to the prototype 825 for class "orange"; and image sample 811 has its noisy label "orange" corrected as "lemon" as embedding 831 for image 811 is closely located to the prototype 835 for class "lemon." Image sample 804 is identified as OOD as it is separated from in-distribution samples 801-803; and image sample 814 is identified as OOD as it is separated from in-distribution sample 811-813.

Example Performance

WebVision (see Li et al., Webvision database: Visual learning and understanding from web data. arXiv preprint arXiv:1708.02862, 2017 2017) dataset is used as the noisy source data. It consists of images crawled from Google and Flickr, using visual concepts from ImageNet as queries. Three versions of WebVision with different sizes are experimented: (1) WebVision-V1.0 contains 2.44 m images with the same classes as the ImageNet-1k (ILSVRC 2012) dataset; (2) WebVision-V0.5 is a randomly sampled subset of WebVision-V1.0, which contains the same number of images (1.28 m) as ImageNet-1k; (3) WebVision-V2.0 contains 16 m images with 5k classes.

The training batch size is 256; total number of epochs is 90; optimizer is SGD with a momentum of 0.9; initial learning rate is 0.1, decayed at 40 and 80 epochs; weight decay is 0.0001. The ResNet-50 is used as the encoder. For hyperparameters, set $\tau=0.1$; $\alpha=0.5$; $T=0.8$ ($T=0.6$ for WebVision-V2.0). The momentum for both the momentum encoder and momentum prototypes is set as 0.999. The queue to store momentum embeddings has a size of 8192. Standard data augmentation (crop and horizontal flip) is applied to the encoder's input, and stronger data augmentation (color changes) is applied to the momentum encoder's input. The model is warmed up for 10 epochs by training on all samples with original labels, before applying noise correction.

The momentum prototype learning mechanism described herein (hereinafter "MoPro") is compared with existing weakly-supervised learning methods trained on WebVision-V1.0, where MoPro achieves comparable and even superior performance. The baseline models include MentorNet (Jiang et al., Mentornet: Learning data-driven curriculum for very deep neural networks on corrupted labels, in ICML, pp. 2309-2318, 2018), CurriculumNet (Guo et al., Curriculumnet: Weakly supervised learning from large-scale web images. In ECCV, pp. 139-154, 2018), CleanNet (Lee et al., Cleannet: Transfer Learning for Scalable Image Classifier Training with Label Noise, in CVPR, pp. 5447-5456, 2018), CurriculmNet2 (based both on Guo et al and Tu et al., Protonet: Learning from web data with memory, in CVPR, 2020.) and SOM (Tu et al., 2020).

Since the training dataset has imbalanced number of samples per-class, the following decoupled training steps are performed to re-balance the classifier: (1) pretrain the model with MoPro; (2) perform noise correction on the training data using the pretrained model, following the method in FIG. 6; (3) keep the pretrained encoder fixed and finetune the classifier on the cleaned dataset, using square-root data sampling which balances the classes. The training is then finetuned for 15 epochs, using a learning rate of 0.01 which is decayed at 5 and 10 epochs. The performance comparison is illustrated in Table 1.

TABLE 1

Performance Comparison on WebVision V1.0

| | | WebVision | | ImageNet | |
|---|---|---|---|---|---|
| Method | Architecture | top-1 | top-5 | top-1 | top-5 |
| MentorNet (Jiang et al., 2018) | Inception-ResNet-V2 | 70.8 | 88.0 | 62.5 | 83.0 |
| CurriculumNet (Guo et al., 2018) | Inception-V2 | 72.1 | 89.1 | 64.8 | 84.9 |

TABLE 1-continued

Performance Comparison on WebVision V1.0

| Method | Architecture | WebVision top-1 | WebVision top-5 | ImageNet top-1 | ImageNet top-5 |
|---|---|---|---|---|---|
| CleanNet (Lee et al., 2018) | ResNet-50 | 70.3 | 87.8 | 63.4 | 84.6 |
| CurriculemNet (Guo et al., 2018; Tu et al., 2020) | ResNet-50 | 70.7 | 88.6 | 62.7 | 83.4 |
| SOM (Tu et al., 2020) | ResNet-50 | 72.2 | 89.5 | 65.0 | 85.1 |
| Cross-Entropy | ResNet-50 | 72.4 | 89.0 | 65.7 | 85.1 |
| MoPro | ResNet-50 | 73.9 | 90.0 | 67.8 | 87.0 |

Table 1 shows a comparison with existing methods onWebVision-V1.0 dataset. Numbers denote top-1 (top-5) accuracy (%) on the clean WebVision-V1.0 validation set and the ILSVRC 2012 validation set.

The partially-labeled learned models may be further transferred to a variety of downstream tasks. MoPro yields superior performance in image classification, object detection, instance segmentation, and obtains better robustness to domain shifts.

First, the learned representation is transferred to downstream tasks with few training samples. Low-shot classification is performed on two datasets: PASCAL VOC2007 (Everingham et al., The pascal visual object classes (VOC) challenge. International Journal of Computer Vision, 88(2): 303-338, 2010) for object classification and Places205 (Zhou et al., Learning deep features for scene recognition using places database, in NIPS, pp. 487-495, 2014) for scene recognition. Linear SVMs are trained using fixed representations from pretrained models. The number k of samples per-class are varied and report the average result across 5 independent runs. Table 2 shows the results. When pretrained on weakly-labeled datasets, MoPro consistently outperforms the vanilla CE method. The improvement of MoPro becomes less significant when the number of images increases from 2.4 m to 16 m, suggesting that increasing dataset size is a viable solution to combat noise.

TABLE 2

Performance Comparison on VOC07 and Places205

| Method | Pretrain Dataset | VOC07 k=1 | k=2 | k=4 | k=8 | k=16 | Places205 k=1 | k=2 | k=4 | k=8 | k=16 |
|---|---|---|---|---|---|---|---|---|---|---|---|
| MoCo v2 | ImageNet | 46.3 | 58.4 | 64.9 | 72.5 | 76.1 | 11.0 | 17.0 | 22.6 | 28.1 | 32.4 |
| CE | ImageNet | 54.3 | 67.7 | 73.9 | 79.6 | 82.3 | 14.9 | 21.0 | 26.9 | 32.1 | 36.0 |
| CE | WebVision-V0.5 | 49.8 | 63.9 | 69.9 | 76.1 | 79.2 | 13.5 | 19.3 | 24.7 | 29.5 | 33.8 |
| MoPro | V0.5 | 54.3 | 67.8 | 73.5 | 79.2 | 81.8 | 15.0 | 21.2 | 26.6 | 31.8 | 36.0 |
| CE | WebVision-V1.0 | 54.5 | 67.1 | 72.8 | 78.4 | 81.4 | 15.1 | 21.5 | 27.2 | 32.1 | 36.4 |
| MoPro | V1.0 | 59.5 | 71.3 | 76.5 | 81.4 | 83.7 | 16.9 | 23.2 | 29.2 | 34.5 | 38.7 |
| CE | WebVision-V2.0 | 63.0 | 73.8 | 78.7 | 83.0 | 85.4 | 21.8 | 28.6 | 35.1 | 40.0 | 43.6 |
| MoPro | V2.0 | 64.8 | 74.8 | 79.9 | 83.9 | 86.1 | 22.2 | 29.2 | 35.6 | 40.9 | 44.4 |

When compared with ImageNet pretrained models, MoPro substantially outperforms self-supervised learning, e.g., MoCo v2 (Chen et al., Improved baselines with momentum contrastive learning. arXiv preprint arXiv: 2003.042972020b), and achieves comparable performance with supervised learning when the same amount of web images (i.e. WebVision-V0.5) is used.

In addition, experiment is performed to evaluate whether the pretrained model provides a good basis for finetuning when the downstream task has limited training data. The pretrained model is finetuned on 1% or 10% of ImageNet training samples. Table 3 shows the results. MoPro consistently outperforms CE when pretrained on weakly-label datasets. Compared to self-supervised learning methods pretrained on ImageNet, weakly-supervised learning achieves significantly better performance with fewer number of epochs.

Table 3: Low-resource finetuning on ImageNet. A pretrained model is finetuned with 1% or 10% of ImageNet training data. Weakly-supervised learning with MoPro substantially outperforms self-supervised learning methods: SimCLR (Chen et al.), BYOL (Grill et al., Bootstrap your own latent: A new approach to self-supervised learning. arXiv preprint arXiv:2006.07733, 2020).

TABLE 3

Low-Resource finetuning on ImageNet

| | Method | Pretrain dataset | #Pretrain epochs | Top-1 1% | Top-1 10% | Top-5 1% | Top-5 10% |
|---|---|---|---|---|---|---|---|
| Supervised | CE | None | None | 25.4 | 56.4 | 48.4 | 80.4 |
| Self-supervised | SimCLR | ImageNet | 1000 | 48.3 | 65.6 | 75.5 | 87.8 |
| | BYOL | | 1000 | 53.2 | 68.8 | 78.4 | 89.0 |
| Weakly-supervised | CE | WebVision-V0.5 | 90 | 65.9 | 72.4 | 87.0 | 90.9 |
| | MoPro (ours) | V0.5 | | 69.3 | 73.3 | 89.1 | 91.7 |
| | CE | WebVision-V1.0 | 90 | 67.6 | 73.5 | 88.3 | 91.7 |
| | MoPro (ours) | V1.0 | | 71.2 | 74.8 | 90.5 | 92.4 |
| | CE | WebVision-V2.0 | 90 | 62.1 | 72.9 | 86.9 | 91.4 |
| | MoPro (ours) | V2.0 | | 65.3 | 73.7 | 88.2 | 92.1 |

The pretrained model is further transferred to object detection and instance segmentation tasks on COCO (Lin et al., Microsoft COCO: common objects in context. In ECCV, pp. 740-755, 2014). The pretrained ResNet-50 is used as the backbone for a Mask-RCNN with FPN. All layers are finetuned end-to-end, including BN. The schedule is the default 1× or 2× in Girshick et al., Exploring the limits of weakly supervised pretraining. In ECCV, pp. 185-201, 2018. Table 4 shows the results. Weakly-supervised learning with MoPro outperforms both supervised learning on ImageNet and self-supervised learning on one billion Instagram images.

TABLE 4

Object Detection and Instance Segmentation

| Method | Pretrain dataset | $AP^{bb}$ | $AP_{50}^{bb}$ | $AP_{75}bb$ | $AP^{mk}$ | $AP_{50}^{mk}$ | |
|---|---|---|---|---|---|---|---|
| random | None | 31.0 | 49.5 | 33.2 | 28.5 | 46.8 | 30.4 |
| CE | ImageNet | 38.9 | 59.6 | 42.7 | 35.4 | 56.5 | 38.1 |
| MoCo | Instagram-1B | 38.9 | 59.4 | 42.3 | 35.4 | 56.5 | 37.9 |
| CE | WebVision-V1.0 | 39.2 | 60.0 | 42.9 | 35.6 | 56.8 | 38.0 |
| MoPro | V1.0 | 39.7 (+08) | 60.9 (+1.3) | 43.1 (+0.4) | 36.1 (+0.7) | 57.5 (+1.0) | 38.6 (+0.5) |
| MoPro | WebVision-V2.0 | 40.7 (+1.8) | 61.7 (+2.1) | 44.5 (+1.8) | 36.8 (+1.4) | 58.4 (+1.9) | 39.6 (+1.5) |

(a) 1 × schedule

| Method | Pretrain dataset | $AP^{bb}$ | $AP_{50}^{bb}$ | $AP_{75}^{bb}$ | $AP^{mk}$ | $AP_{50}^{mk}$ | $AP_{75}^{mk}$ |
|---|---|---|---|---|---|---|---|
| random | None | 36.7 | 56.7 | 40.0 | 33.7 | 53.8 | 35.9 |
| CE | ImageNet | 40.6 | 61.3 | 44.4 | 36.8 | 58.1 | 39.5 |
| MoCo | Instagram-1B | 41.1 | 61.8 | 45.1 | 37.4 | 59.1 | 40.2 |
| CE | WebVision- | 40.9 | 61.6 | 44.7 | 37.2 | 58.7 | 40.1 |
| MoPro | V1.0 | 41.2 (+0.6) | 62.2 (+0.9) | 45.0 (+0.6) | 37.4 (+0.6) | 58.9 (+0.8) | 40.3 (+0.8) |
| MoPro | WebVision-V2.0 | 41.8 (+1.2) | 62.6 (+1.3) | 45.6 (+1.2) | 37.8 (+1.0) | 59.5 (+1.4) | 40.6 (+1.1) |

(a) 2 × schedule

It has been shown that deep models trained on ImageNet lack robustness to out-of-distribution samples, often falsely producing over-confident predictions. Existing system has curated two benchmark datasets to evaluate models' robustness to real-world distribution variation: (1) ImageNet-R (Hendrycks et al., The many faces of robustness: A critical analysis of out-of-distribution generalization. arXiv preprint arXiv:2006.16241, 2020) which contains various artistic renditions of object classes from the original ImageNet dataset, and (2) ImageNet-A (Hendrycks et al., Natural adversarial examples. arXiv preprint arXiv:1907.07174, 20192019) which contains natural images where ImageNet-pretrained models consistently fail due to variations in background elements, color, or texture. Both datasets contain 200 classes, a subset of ImageNet's 1,000 classes.

TABLE 5

Evaluation of Model Robustness

| | | ImageNet-R | | ImageNet-A | |
|---|---|---|---|---|---|
| Method | Pretrain dataset | Accuracy (↑) | Calib. Error (↓) | Accuracy (↑) | Calib. Error (↓) |
| CE | ImageNet | 36.14 | 19.66 | 0.03 | 62.50 |
| CE | WebVision-V1.0 | 40.56 | 10.05 | 10.24 | 37.84 |
| MoPro | | 54.87 | 5.73 | 11.93 | 35.85 |

Table 5 shows evaluation of model robustness on images with artistic and natural distribution shifts. Weakly-supervised learning with MoPro leads to a more robust and well-calibrated model.

Some examples of computing devices, such as computing device 400 may include non-transitory, tangible, machine readable media that include executable code that when run by one or more processors (e.g., processor 410) may cause the one or more processors to perform the processes of methods 500-600. Some common forms of machine readable media that may include the processes of methods 500-600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for partially-supervised learning, the system comprising:
a non-transitory memory storing a neural network model and a training dataset comprising a set of partially-labeled data samples, each data sample having a noisy training label that belongs to a plurality of classes; and
one or more hardware processors coupled to the non-transitory memory and configured to read instructions from the non-transitory memory to cause the system to perform operations comprising:
generating, for each partially-labeled data sample, an augmented data sample by varying data content of the respective partially-labeled data sample;
encoding, by an encoder of the neural network model, the augmented data sample into a representation vector;
generating, by a classifier of the neural network model, a pseudo label corresponding to the augmented data sample based at least in part on the representation vector;
computing at least one current momentum prototype corresponding to the pseudo label by taking a moving average of normalized embeddings that correspond to a same class according to the pseudo label;
computing a prototypical contrastive loss based on comparing a similarity between the normalized embedding and the at least one current momentum prototype;
computing a combined loss based on a weighted sum of (i) a cross-entropy loss between the pseudo label and a classification based on the representation vector, (ii) an instance contrastive loss between the normalized embedding and a momentum embedding of the augmented data sample, and (iii) the prototypical contrastive loss; and
updating the neural network model by minimizing the combined loss.

2. The system of claim 1, wherein the neural network model comprises:
an encoder configured to map the augmented data sample to a representation vector; and
a projection network configured to map the representation vector to the normalized embedding.

3. The system of claim 2, wherein the neural network model further comprises:
the classifier configured to generate classification probabilities corresponding to the representation vector.

4. The system of claim 3, wherein the operations further comprise:
generating a different version of augmented data sample from the respective partially-labeled data sample, and
wherein the neural network model further comprises:
a momentum encoder and a momentum decoder configured to generate a momentum embedding from the different version of augmented data sample,
wherein the momentum encoder and the momentum decoder have parameters derived from parameters associated with the encoder and the projection network, respectively.

5. The system of claim 3, wherein the operations further comprise:
generating a soft pseudo label based on the classification probabilities and the normalized embedding; and
converting the soft pseudo label to the pseudo label by:
determining whether the partially-labeled data sample is an out-of-distribution sample by comparing the soft pseudo label with a unified distribution; and
determining whether the noisy label is to be corrected by comparing the soft pseudo label with a threshold.

6. The system of claim 5, wherein the operations further comprise:
in response to determining that the partially-labeled data sample is out-of-distribution based on the pseudo label, removing the partially-labeled data sample from computation of the prototypical contrastive loss.

7. The system of claim 5, wherein the operations further comprise:
in response to determining that the noisy label is to be corrected, generating the pseudo label as a class corresponding to a highest soft pseudo label among the plurality of classes.

8. The system of claim 5, wherein the operations further comprise:
computing the cross-entropy loss based on the classification probabilities and the pseudo label when the partially-labeled data sample is not out-of-distribution.

9. A method for partially-supervised learning, the method comprising:
obtaining, via a data interface, a training dataset comprising a set of partially-labeled data samples, each data sample having a noisy training label that belongs to a plurality of classes;
generating, for each partially-labeled data sample, an augmented data sample by varying data content of the respective partially-labeled data sample;
encoding, by an encoder of a neural network model, the augmented data sample into a representation vector;
generating, by a classifier of the neural network model, a pseudo label corresponding to the augmented data sample based at least in part on the representation vector;
computing at least one current momentum prototype corresponding to the pseudo label by taking a moving average of normalized embeddings that correspond to a same class according to the pseudo label;
computing a prototypical contrastive loss based on comparing a similarity between the normalized embedding and the at least one current momentum prototype;
computing a combined loss based on a weighted sum of (i) a cross-entropy loss between the pseudo label and a classification based on the representation vector, (ii) an instance contrastive loss between the normalized embedding and a momentum embedding of the augmented data sample, and (iii) the prototypical contrastive loss; and
updating the neural network model by minimizing the combined loss.

10. The method of claim 9, wherein the neural network model comprises:
an encoder configured to map the augmented data sample to a representation vector; and a projection network configured to map the representation vector to the normalized embedding.

11. The method of claim 10, wherein the neural network model further comprises:
the classifier configured to generate classification probabilities corresponding to the representation vector.

12. The method of claim 11, further comprising:
generating a different version of augmented data sample from the respective partially-labeled data sample, and
wherein the neural network model further comprises:
a momentum encoder and a momentum decoder configured to generate a momentum embedding from the different version of augmented data sample,
wherein the momentum encoder and the momentum decoder have parameters derived from parameters associated with the encoder and the projection network, respectively.

13. The method of claim 11, further comprising:
generating a soft pseudo label based on the classification probabilities and the normalized embedding; and
converting the soft pseudo label to the pseudo label by:
determining whether the partially-labeled data sample is an out-of-distribution sample by comparing the soft pseudo label with a unified distribution; and
determining whether the noisy label is to be corrected by comparing the soft pseudo label with a threshold.

14. The method of claim 13, further comprising:
in response to determining that the partially-labeled data sample is out-of-distribution based on the pseudo label, removing the partially-labeled data sample from computation of the prototypical contrastive loss; and
in response to determining that the noisy label is to be corrected, generating the pseudo label as a class corresponding to a highest soft pseudo label among the plurality of classes.

15. The method of claim 13, further comprising:
computing the cross-entropy loss based on the classification probabilities and the pseudo label when the partially-labeled data sample is not out-of-distribution.

16. A non-transitory processor-readable medium storing processor-executable instructions for partially-labeled learning, the instructions being processor-executable by a processor to perform operations comprising:
obtaining a training dataset comprising a set of partially-labeled data samples, each data sample having a noisy training label that belongs to a plurality of classes; and
generating, for each partially-labeled data sample, an augmented data sample by varying data content of the respective partially-labeled data sample;
encoding, by an encoder of a neural network model, the augmented data sample into a representation vector;
generating, by a classifier of the neural network model, a pseudo label corresponding to the augmented data sample based at least in part on the representation vector;
computing at least one current momentum prototype corresponding to the pseudo label by taking a moving average of normalized embeddings that correspond to a same class according to the pseudo label;
computing a prototypical contrastive loss based on comparing a similarity between the normalized embedding and the at least one current momentum prototype;
computing a combined loss based on a weighted sum of (i) a cross-entropy loss between the pseudo label and a classification based on the representation vector, (ii) an instance contrastive loss between the normalized embedding and a momentum embedding of the augmented data sample, and (iii) the prototypical contrastive loss; and
updating the neural network model by minimizing the combined loss.

17. The non-transitory processor-readable medium of claim 16, wherein the neural network model comprises:
an encoder configured to map the augmented data sample to a representation vector; and
a projection network configured to map the representation vector to the normalized embedding.

18. The non-transitory processor-readable medium of claim 17, wherein the neural network model further comprises:
the classifier configured to generate classification probabilities corresponding to the representation vector.

19. The non-transitory processor-readable medium of claim 18, wherein the operations further comprise:
generating a different version of augmented data sample from the respective partially-labeled data sample, and
wherein the neural network model further comprises:
a momentum encoder and a momentum decoder configured to generate a momentum embedding from the different version of augmented data sample,
wherein the momentum encoder and the momentum decoder have parameters derived from parameters associated with the encoder and the projection network, respectively.

20. The non-transitory processor-readable medium of claim 19, wherein the operations further comprise:
generating a soft pseudo label based on the classification probabilities and the normalized embedding; and
converting the soft pseudo label to the pseudo label by:
determining whether the partially-labeled data sample is an out-of-distribution sample by comparing the soft pseudo label with a unified distribution; and
determining whether the noisy label is to be corrected by comparing the soft pseudo label with a threshold.

* * * * *